Figure 1:
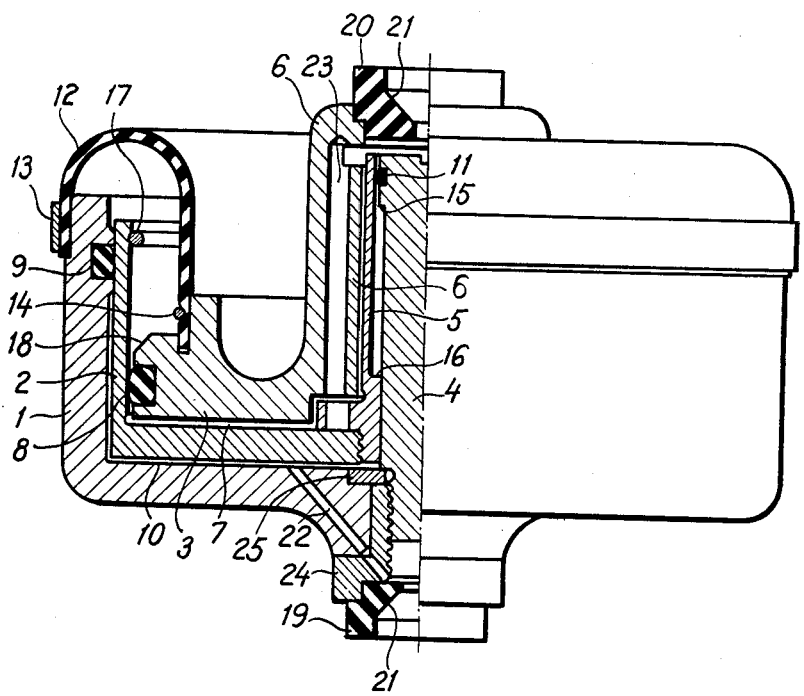

Nov. 27, 1962  J. B. F. HASS  3,065,733
FLUID-OPERATED ACTUATING DEVICE FOR
WELDING TONGS AND THE LIKE
Filed Sept. 19, 1960  2 Sheets-Sheet 1

INVENTOR.
John B. F. Hass
BY Davis, Hoxie, Faithfull & Hapgood
Attorneys

United States Patent Office 3,065,733
Patented Nov. 27, 1962

3,065,733
FLUID-OPERATED ACTUATING DEVICE FOR WELDING TONGS AND THE LIKE
John Bertil Frederic Hass, Olofstrom, Sweden, assignor to Aktiebolaget Separator, Stockholm, Sweden, a corporation of Sweden
Filed Sept. 19, 1960, Ser. No. 57,008
5 Claims. (Cl. 121—38)

This invention relates to devices for actuating welding tongs, and the like, and has particular reference to an improved fluid-activated device for this purpose. For illustrative purposes, the invention will be described in reference to welding tongs, which are to be actuated to move the usual welding electrodes toward or away from each other, although it is to be understood that the invention is not limited to such use.

Welding tongs are used for spot-welding. Often, the spots to be welded are situated so that the mouth of the welding tongs must be deep, that is, so that the arms carrying the welding electrodes must be long. Also, there may be obstacles inside which the weld spots are located and which thus must pass through the mouth or gap between the electrodes. It must therefore be possible to move the electrodes apart to a sufficient degree. However, those weld spots which are situated inside the obstacle usually require a relatively small mouth or gap. The consequence of this is that the mouth, on one hand, must be opened to a relatively great extent to permit carrying the electrodes past the obstacle and, on the other hand, must then be closed more or less to permit moving of the electrodes between the weld spots. Thereafter, the mouth of the tongs must again be opened to a relatively great extent when the tongs are removed, in order to permit the obstacle to pass by the electrodes, through the mouth between them.

When the tongs are operated to vary the mouth size by means of a pressure-fluid-actuated piston in a cylinder, certain difficulties have been encountered. To allow the piston to work as efficiently as possible, it should be possible to stop it half-way or so for the small openings of the mouth. For the large opening, however, the piston should make a greater or complete stroke. If a spring is used to actuate the piston so that the pressure fluid is driven out by means of the spring power, it is possible to cut off the discharge of pressure fluid at the right moment from the cylinder (by means of a valve) and thus stop the piston in an intermediate position, whereby the piston need not effect a complete stroke when the electrodes are to be moved from one weld spot to an adjacent one. It is not always easy, however, to interrupt the discharge at the right moment if the movements are carried out very rapidly, as is desired.

The principal object of the present invention is to provide a device of the character described which overcomes the above-mentioned difficulties.

An actuating device made according to the invention comprises at least two coaxial pistons which are nested one in the other and can be pushed out telescopically from a common casing, each piston being slidable in a separate piston chamber and being arranged to be separately actuated by the pressure fluid. It is possible in this way to cause the electrode tips of the welding tongs to take at least two fixed opening positions adapted to the actual working conditions, so that the mouth or gap between the electrodes which is required at any particular moment is obtained. Each piston chamber may be provided with its own separate passage for admission and discharge of pressure fluid, whereby it is possible to displace each piston in its chamber without displacing the other piston in its chamber. In the preferred structure, the actuating device is arranged between two journals or the like which project from the shanks of the welding tongs and have spherical contact surfaces engaging mating parts of the casing and the inner of the nested pistons, respectively, whereby the device is relieved of any external non-axial forces so that the guides for the pistons may be made relatively short without their life being reduced. This shortens the total structural length of the actuating device and thereby makes it easier to build it into the tongs. At the same time, an extremely rapid replacement of the actuating device can be expected when this is required. Preferably, the journals are in the form of conduits so that they serve not only to connect the actuating device mechanically to the tongs but also to lead the pressure fluid separately to the respective piston chambers.

Figure 2:
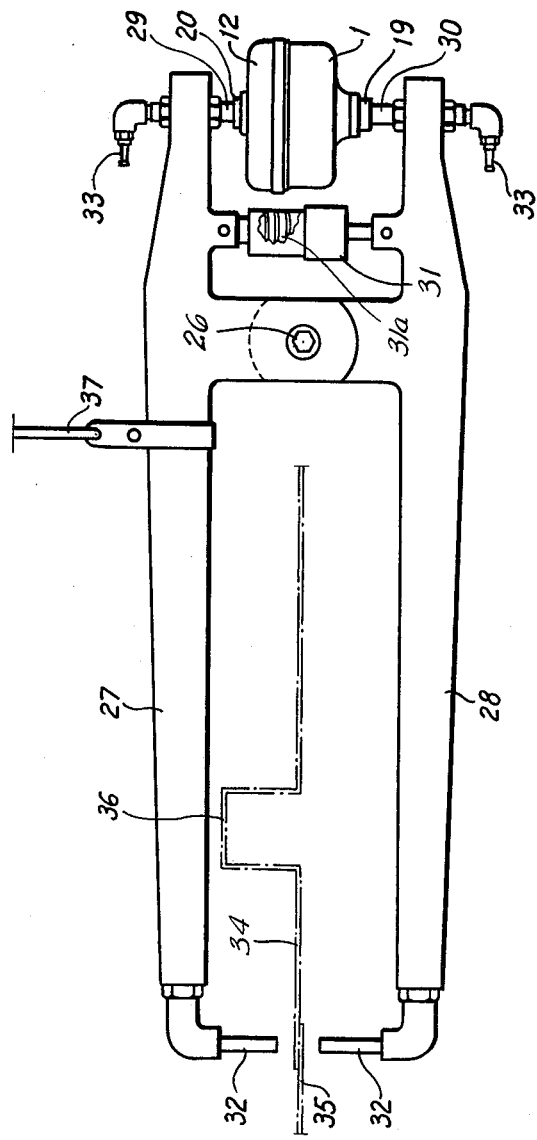

The invention is described more in detail below, reference being made to the accompanying drawings, in which FIG. 1 is a vertical sectional view of a preferred form of the actuating device, and FIG. 2 is a side view of a pair of tongs provided with the actuating device.

The actuating device as shown in FIG. 1 comprises a casing 1 containing a piston 2 slidable in the casing, a piston 3 being slidable in the piston 2. The two pistons 2 and 3 are coaxial and are adapted to be pushed axially of the casing in one direction telescopically. An axial guide pin 4 in the casing is secured thereto in any suitable manner and is surrounded by a nave sleeve 5 secured to the outer piston 2. The sleeve 5 is in turn surrounded by a nave sleeve 6 integral with the inner piston 3. The outer piston 2 is recessed to form a chamber 7 for the inner piston 3, the latter being provided with a piston ring 8 slidably engaging the surrounding wall of chamber 7. In the casing 1 is a packing ring 9 for sealing the piston chamber 10 containing the piston 2, which chamber is further sealed by a packing ring 11 on the guide pin. A protecting collar 12 of soft material, such as leather or rubber, is attached to the casing 1 and the piston 3 by means of rings 13 and 14, respectively, and serves as a shield to protect the slide surfaces against dust and the like. The pin 4 and the sleeve 5 are provided with stop surfaces 15 and 16, respectively, which cooperate with each other to limit the stroke length of the piston 2. The stroke length of the piston 3 is defined by a stop ring 17 which is arranged in the piston 2 and which cooperates with a stop surface 18 on the piston 3. The casing 1 and the piston 3 are provided with centrally arranged members 19 and 20, respectively, each having a seat in the form of a conical sealing surface 21 and made of a relatively soft material which is resistant to wear and also is electrically insulating, such as nylon. The seats are bored through and form, together with channels 22 and 23 in the casing and the nave sleeve 6, respectively, passages through which the pressure fluid is separately admitted to or exhausted from the two piston chambers. The seat 19 is held in a nut 24 which, together with a supporting ring 25, retains the pin 4 in the casing 1.

As shown in FIG. 2, the actuating device is interposed between the shanks 27, 28 of a pair of welding tongs, the shanks being pivotally interconnected by a common shaft 26. Here, 1 denotes the casing of the actuating device, 12 the protecting collar, and 19 and 20 the seat members against the conical surfaces 21 of which the spherically formed inner end of journals 29 and 30 are pressed by means of a tension spring or biasing element 31a which is enclosed in a spring housing 31 and tends to open the mouth between the electrode tips 32 of the welding tongs. The journals 29 and 30 are shown as conduits secured to the actuating end portions of shanks 27 and 28, respectively, and serving to conduct pressure fluid to the seat members 20 and 19, respectively. The journals 29 and 30 are provided with tube nipples 33 which, together with tubes and valves (not shown), may connect each of the piston chambers alternatively to a pressure-fluid source and to the atmospheric air. In FIG. 2, broken lines indicate a work-piece consisting of two sheets or plates 34, 35 which partly overlap each other and are to be joined by means of spot-welding. One of the plates 34 forms an obstacle 36 which must pass through the mouth between the electrode tips 32 when these, by the suspension means 37 of the tongs, are carried to and from the joint. This is made possible by leading off pressure fluid, usually compressed air, from the two piston chambers 7 and 10 of the actuating device, whereby the electrode tips (by means of the spring 31a in the spring housing 31) are carried apart from each other a distance corresponding approximately to the sum of the stroke lengths of the two pistons 2 and 3. If, however, it is desired to move the electrode tips only from the position of one weld spot to the position of another weld spot, it may be sufficient to exhaust pressure fluid from only one of the piston chambers, such as the upper one 7. The electrode tips are then carried apart only as much as corresponds to the stroke length of the piston in this piston chamber or somewhat less. The two piston chambers are filled with pressure fluid only during the welding operation itself. One of the valves controlling the supply and discharge of pressure fluid to the piston chambers may be connected to the usual means (not shown) controlling the supply of the welding current so that the pressure fluid is exhausted from this piston chamber at the same time as the switching-off of the weld current takes place.

I claim:

1. In an actuating device operable by pressure fluid to actuate a pair of welding tongs and the like, the combination of a cylindrical casing forming a first chamber, a pair of telescoping coaxial pistons including an outer piston slidable in said chamber and an inner piston slidable in said outer piston and defining therewith a second chamber between the pistons, the casing having at one end a central opening communicating with one of said chambers, one of the pistons having a central opening leading from the opposite end of the casing and communicating with the other chamber, and pressure fluid supply means including two conduits at opposite ends of the casing communicating separately with said chambers, respectively through the respective central openings, whereby said conduits are operable to direct pressure fluid from opposite ends of the casing to the respective chambers.

2. The combination defined in claim 1, in which said one piston having said central opening is the inner piston.

3. The combination defined in claim 1, in which the casing and said one piston have funnel-shaped seats forming said central openings, the conduits having ends closely engaging the respective seats.

4. The combination defined in claim 1, in which the casing and said one piston have seats forming said central openings, the combination comprising also releasable means holding an end of each conduit against the corresponding seat.

5. The combination defined in claim 1, in which the casing and said one piston have seats forming said central openings, the combination comprising also releasable means holding an end of each conduit against the corresponding seat, said releasable means including a pair of tongs pivotally interconnected intermediate their ends to form opposed working end portions and opposed actuating end portions, the conduits being secured to said actuating end portions, respectively; and a biasing element connected to the tongs to urge said working end portions apart from each other and thereby urge said conduits against their respective seats.

References Cited in the file of this patent

UNITED STATES PATENTS

| | | |
|---|---|---|
| 1,645,705 | Lewdwinka | Oct. 18, 1927 |
| 2,063,257 | Martin | Dec. 8, 1936 |
| 2,341,458 | Martin | Feb. 8, 1944 |
| 2,358,826 | Purat | Sept. 26, 1944 |
| 2,369,294 | Harris | Feb. 13, 1945 |
| 2,376,692 | Heim | May 22, 1945 |
| 2,514,747 | Daniels | July 11, 1950 |
| 2,661,599 | Folmer | Dec. 8, 1953 |